Figure 1:
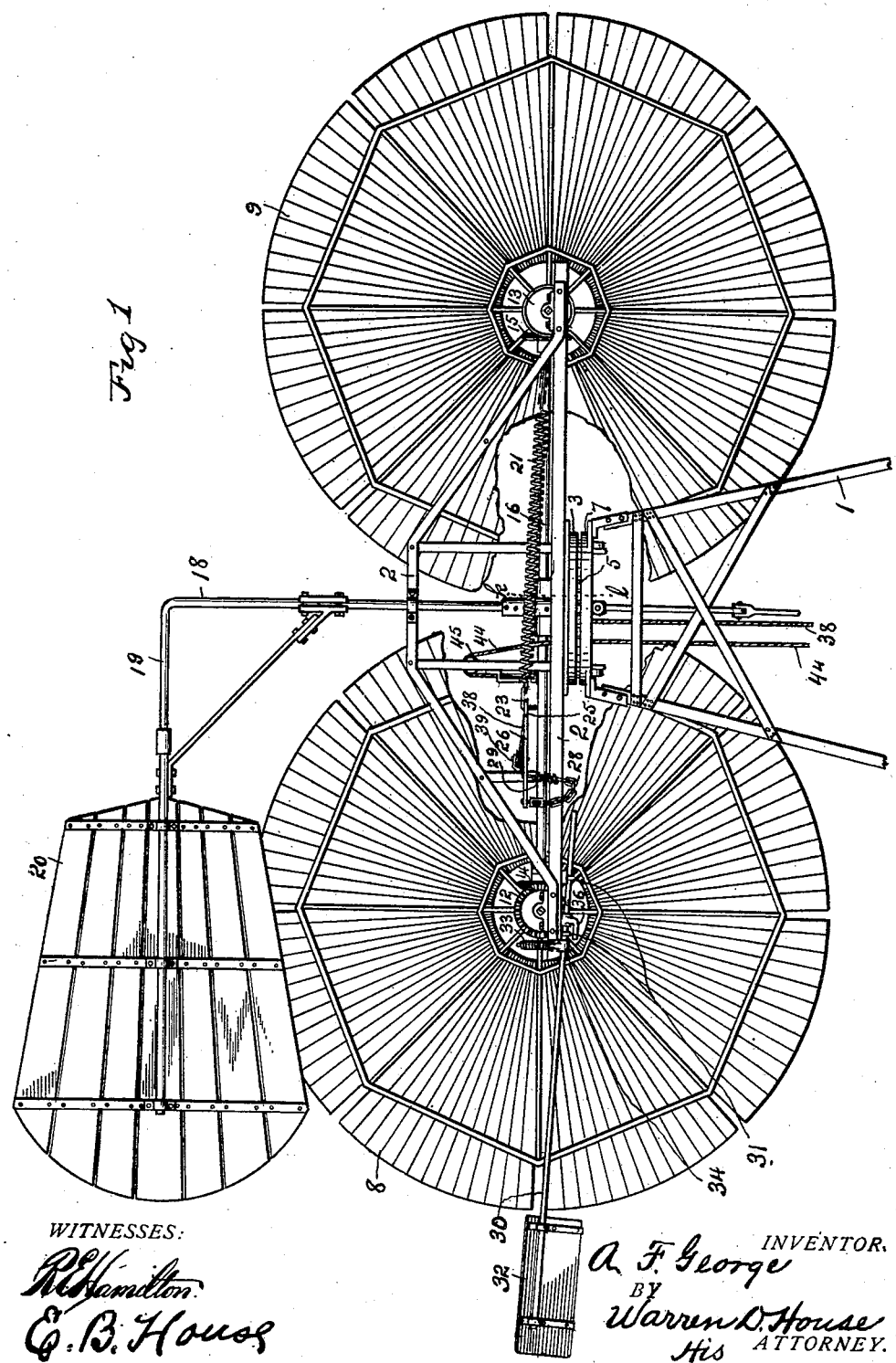

A. F. GEORGE.
WINDMILL.
APPLICATION FILED NOV. 27, 1909.

991,842.

Patented May 9, 1911.

2 SHEETS—SHEET 1.

WITNESSES:
R. E. Hamilton
E. B. House

INVENTOR.
A. F. George
BY
Warren D. House
His ATTORNEY.

A. F. GEORGE.
WINDMILL.
APPLICATION FILED NOV. 27, 1909.
991,842.
Patented May 9, 1911.
2 SHEETS—SHEET 2.
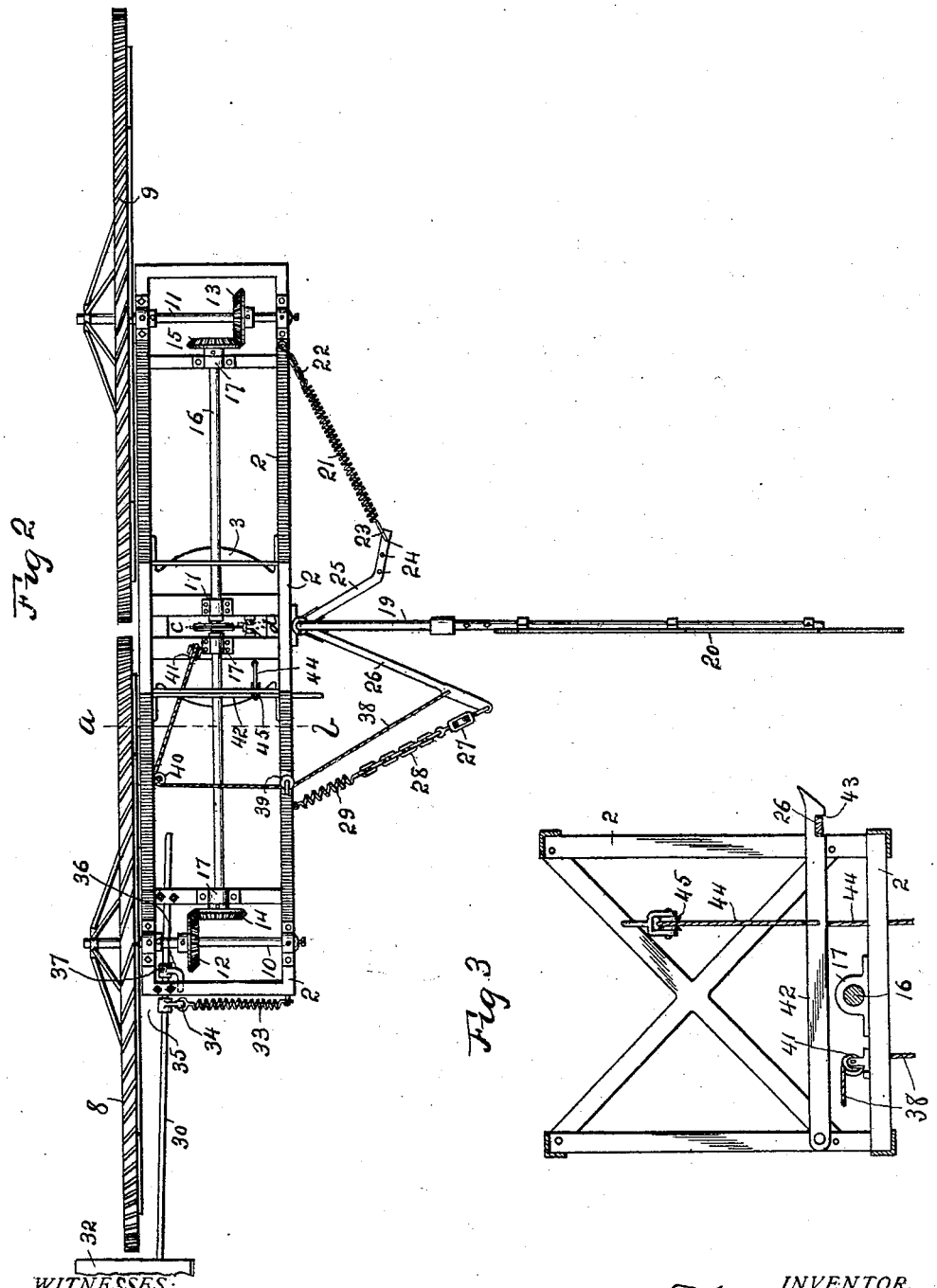
WITNESSES:
R. E. Hamilton
E. B. House
INVENTOR.
A. F. George
BY
Warren D. House
His ATTORNEY.

UNITED STATES PATENT OFFICE.

ALBERT F. GEORGE, OF ENID, OKLAHOMA.

WINDMILL.

991,842.  Specification of Letters Patent.  Patented May 9, 1911.

Application filed November 27, 1909. Serial No. 530,252.

*To all whom it may concern:*

Be it known that I, ALBERT F. GEORGE, a citizen of the United States, residing at Enid, in the county of Garfield and State of Oklahoma, have invented certain new and useful Improvements in Windmills, of which the following is a specification.

My invention relates to improvements in windmills.

One of the objects of my invention is to provide governing means of a novel character by which, when the wind pressure is too great, the wind wheel or wheels of a wind mill may be thrown more or less out of operative position relative to the wind.

Another object of my invention is to provide a novel means for converting the rotary movement of the wind wheel into a reciprocating movement of the plunger.

The novel features of my invention are hereinafter fully described and claimed.

In the accompanying drawings which illustrate my invention—Figure 1 is a side elevation of a wind mill having a plurality of wind wheels and which is provided with my invention. In this view some of the parts are broken away for clearness, and the wind wheels are shown out of operative position relative to the wind. Fig. 2 is a plan view of the wind mill shown in Fig. 1, the wind wheels being shown in operative position, or thrown into the wind. Fig. 3 is a vertical section on the dotted line $a$—$b$ of Fig. 2.

Similar characters of reference denote similar parts.

1 denotes the ordinary vertical tower on which is rotatively mounted, around a horizontal axis, a wind wheel support comprising a frame 2, which is mounted on a horizontal plate 3, having a circular ball race in which are mounted a series of balls 5, supported in an annular ball race of a horizontal plate 7, supported on the upper end and forming a part of the tower 1.

8 and 9 denote respectively two wind wheels secured respectively to two horizontal shafts 10 and 11, rotatively mounted on the frame 2 and having rigidly secured respectively thereto bevel gear wheels 12 and 13 which mesh respectively with two gear wheels 14 and 15, secured rigidly on a horizontal shaft 16, rotatively mounted in bearings 17, supported on the frame 2.

18 denotes a right angled bar, the vertical portion of which, denoted by 18, is rotatively mounted in the frame 2. To the horizontal portion 19 of said bar, is secured the main vane 20. The function of this vane is to normally hold the support or frame 2, in operative position, that is, with the wind wheels 8 and 9, facing the wind and disposed perpendicular to the vane 20, as shown in Fig. 2. To effect this function I preferably provide spring actuated means adjustable as to tension for connecting the main vane with the frame 2. The construction comprises the following described parts:—21 denotes a coil spring, one end of which is connected to a chain 22, secured to the frame 2, the other end being provided with a hook 23 adapted to enter any one of a plurality of holes 24, provided in a horizontal bar 25, which is secured to the bar 18. Also secured to said bar is a horizontal bar 26, to which is secured by means of an adjusting swivel 27, a chain 28, connected to one end of a coil spring 29, the other end of which is secured to the frame 2. The spring 29, chain 28, adjusting swivel 27, and bar 26, serve to limit the movement of the vane 20 under the tension of the spring 21. The tension of the latter spring may be varied by changing the hook 23 from one to the other of the holes 24. By regulating in the ordinary manner the swivel 27 the tension of the spring 29 may be varied.

For swinging the frame 2 and wind wheels 8 and 9 from the operative position when the wind pressure becomes too great, I provide automatic mechanism comprising preferably the following described mechanism:— 30 denotes a longitudinal substantially horizontal bar rotatively mounted in bearings 31, mounted on the frame 2. To the bar 31 is rigidly secured an auxiliary vane 32, which is normally in a position inclined to the vertical and which is movable by wind pressure toward the vertical position in which position it will be subjected to greater wind pressure and will therefore exert more influence in swinging the frame 2 out of operative position. For resisting this movement of the vane 32 I provide yielding means comprising preferably a coil spring 33, one end of which is secured to the frame 2 and the other end of which is secured to a crank arm 34, mounted on the bar 30, on which it is secured against rotation by means of a set screw 35. At the opposite side of the bearing 31, adjacent to the crank arm 34, is longitudinally adjustably secured a right angled stop plate 36, which is adapted to strike the underside of the frame 2 for holding the vane 32 in the vertical position. A set screw 37 in the plate 36, permits longitudinal adjustment of the plate on the bar 30. By loosening the set screws 35 and 37, the bar 30 may be moved endwise so as to adjust the auxiliary vane 32 toward or from the vertical axis of the frame 2 so as to vary the influence of the auxiliary vane relative to rotation of the frame 2 on its axis. By adjusting the crank arm 34 longitudinally on the bar 30 which is tranverse to the coil spring 33 variation in tension of the spring may be obtained, thereby varying the amount of wind pressure required to swing the vane 32. As the wind pressure increases, the parts being shown as in Fig. 2, the auxiliary vane 32 will be swung from the normal inclined position toward the vertical position, where it will receive more wind pressure and cause the said vane through the bar 30 to swing the frame 2 against the tension of the spring 21 toward the inoperative position shown in Fig. 1. At the wind pressure decreases in strength the spring 33 will retract the auxiliary vane 32 toward its normal inclined position.

To throw the frame 2 completely into inoperative position I provide a cord 38 which has one end secured to the bar 26 and passes horizontally therefrom over pulleys 39 and 40 to a pulley 41 supported on the frame 2. From the pulley 41 the cord 38 passes vertically downward to a position in which a person on the ground may grasp it. By pulling downward on the cord 38 the frame 2 may be swung to the inoperative position shown in Fig. 1. To lock the frame in this position one end of a horizontal bar 42 is pivoted to the frame 2 and has it lower edge provided with a notch 43 adapted to receive the bar 26. The bar 42 serves as a latch which drops by gravity into operative position. To release the bar 26 from the bar 42 the bar has secured to it one end of a cord 44. The cord 44 passes upward to and over a pulley 45 and thence downward to a position in which a person on the ground can grasp it and pull it so as to raise the bar 42.

I do not limit my invention to the structure described and shown as many modifications, within the scope of the appended claims, may be made without departing from its spirit.

Having thus described my invention what I claim and desire to secure by Letters Patent, is:—

1. In a windmill, the combination with a windwheel support rotative on a vertical axis, of a main vane, means by which said vane swings said support into operative position, a rock bar pivoted to said support and adjustable lengthwise toward and from said axis, a crank arm mounted on and adjustable lengthwise of said rock bar, an overbalanced auxiliary vane secured to said bar and movable therewith by wind pressure acting upon the vane from a normally inclined toward a vertical position, and means connecting said crank arm and said support for resisting such movement of the auxiliary vane and rock bar, and adjustable as to resistance by lengthwise adjustment of said rock arm.

2. In a windmill, the combination with a windwheel support rotative on a vertical axis, of a main vane, means by which said vane swings said support into operative position, a rock bar pivoted to said support, and adjustable lengthwise toward and from said axis, a stop plate mounted on and adjustable lengthwise of said rock bar and adapted to strike said support to limit the rocking of said bar, a crank arm mounted on and adjustable lengthwise of said rock bar, an auxiliary vane secured to said rock bar and movable therewith by wind pressure acting upon the vane from a normally inclined toward a vertical position, and means connecting said crank arm and said support for resisting said movement of the auxiliary vane and rock bar and adjustable as to resistance by lengthwise adjustment of said rock arm.

3. In a windmill, the combination with a rotary wind wheel support, of a main vane, means by which said vane swings said support into operative position, a rock bar pivoted to said support and adjustable toward and from the axis of said support, an overbalanced vane secured to said rock bar and movable therewith by wind pressure from a normally inclined toward a vertical position, a crank arm adjustable lengthwise on said rock bar, and a coil spring having one end secured to the support and the other end secured to the crank arm, the crank arm being adjustable on the rock bar toward and from the point on the support at which the spring is secured, whereby the tension of the spring may be varied.

In testimony whereof I have signed my name to this specification in presence of two subscribing witnesses.

ALBERT F. GEORGE.

Witnesses:
E. B. House,
J. C. Irwin.